(12) United States Patent
Tsai

(10) Patent No.: US 12,498,558 B2
(45) Date of Patent: Dec. 16, 2025

(54) WAVELENGTH CONVERSION DEVICE AND MANUFACTURING METHOD THEREOF

(71) Applicant: Coretronic Corporation, Hsin-Chu (TW)

(72) Inventor: Chia-Lun Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 384 days.

(21) Appl. No.: 18/346,799

(22) Filed: Jul. 4, 2023

(65) Prior Publication Data
US 2024/0036303 A1    Feb. 1, 2024

(30) Foreign Application Priority Data

Jul. 28, 2022 (CN) .......................... 202210896418.X

(51) Int. Cl.
  *G02B 26/00* (2006.01)
  *G03B 21/20* (2006.01)
(52) U.S. Cl.
  CPC ......... *G02B 26/008* (2013.01); *G03B 21/204* (2013.01)
(58) Field of Classification Search
  None
  See application file for complete search history.

(56) References Cited

U.S. PATENT DOCUMENTS

2017/0003498 A1*  1/2017  Liu ...................... G02B 26/008

FOREIGN PATENT DOCUMENTS

| CN | 214795550 | 11/2021 |
|----|-----------|---------|
| CN | 216210437 | 4/2022  |

\* cited by examiner

*Primary Examiner* — Bao-Luan Q Le
*Assistant Examiner* — Danell L Owens
(74) *Attorney, Agent, or Firm* — JCIPRNET

(57) ABSTRACT

A wavelength conversion device includes a main body, a counterweight element, and an adhesive. The main body has a first surface, a second surface, multiple through holes, and a recess. The recess is located on the central axis of the wavelength conversion device and is recessed into the main body relative to the first surface, and the recess has a blocking surface surrounding the central axis. The through holes has multiple segments, which are respectively partial inner walls of the through holes. The counterweight element is disposed in the recess and is supported by the blocking surface. An orthographic projection of the through hole corresponding to at least one of the segments on the second surface at least partially overlaps the orthographic projection of the counterweight element on the second surface in the direction parallel to the central axis. The adhesive at least partially covers the counterweight element.

20 Claims, 15 Drawing Sheets

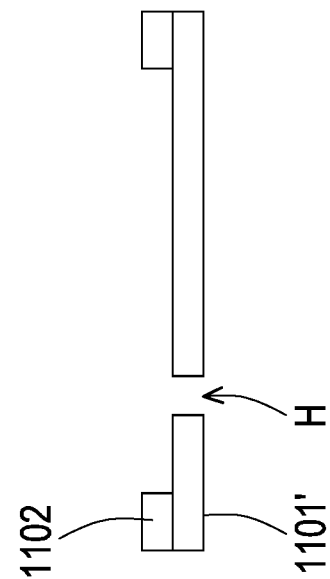

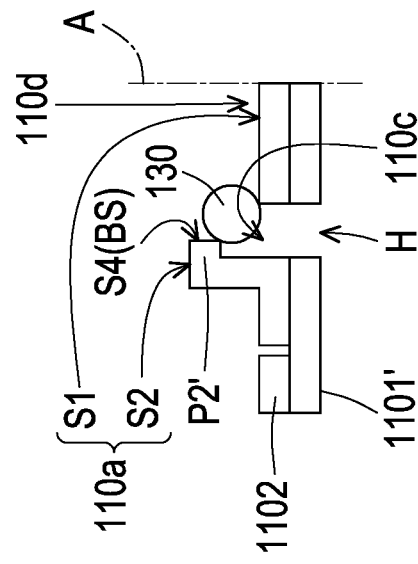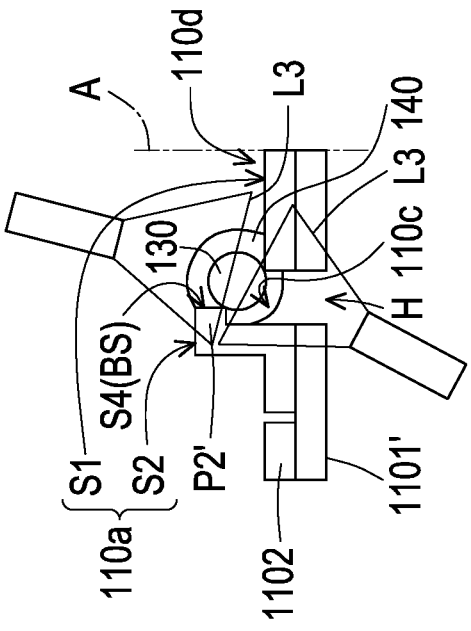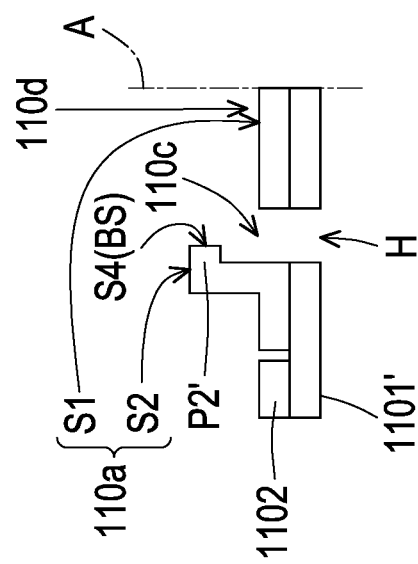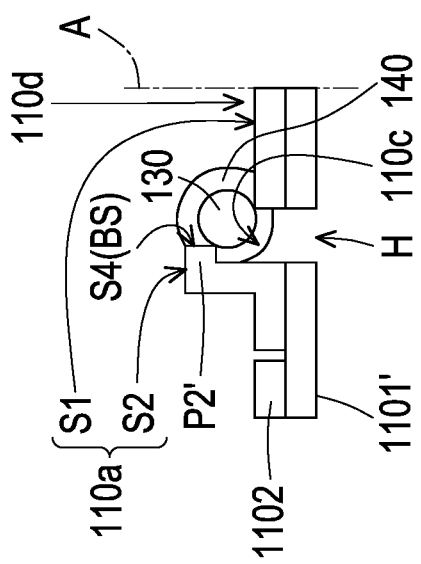

WAVELENGTH CONVERSION DEVICE AND MANUFACTURING METHOD THEREOF

CROSS-REFERENCE TO RELATED APPLICATION

This application claims the priority benefit of China application serial no. 202210896418.X, filed on Jul. 28, 2022. The entirety of the above-mentioned patent application is hereby incorporated by reference herein and made a part of this specification.

BACKGROUND

Technical Field

The disclosure relates to an optical device and a manufacturing method thereof, and in particular relates to a wavelength conversion device and a manufacturing method thereof.

Description of Related Art

In recent years, projection devices based on solid-state light sources such as light-emitting diodes (LEDs) and laser diodes have gradually gained a spot in the market. Laser diodes have a luminous efficiency higher than about 20% compared to light-emitting diodes. In order to break through the light source limitation of light-emitting diodes, laser light sources are gradually developed to excite phosphors to produce pure color light sources for projectors. In addition, the laser projection device uses the laser beam provided by the laser diode to excite the phosphor to emit light, to serve as the illumination light source of the projector, so as to meet the requirements of various brightness of the projector. Therefore, the projector structure using the laser light source device as the light source system has replaced the traditional high-pressure mercury lamp and has become the light source of mainstream projectors.

In the current laser projectors, a phosphor adhesive layer is generally coated on a metal substrate with high reflectivity to form a phosphor wheel, and then the phosphor adhesive layer on the metal substrate of the phosphor wheel is excited by the laser beam emitted by the laser light source device to generate light beams of different colors (such as green light and yellow light). In addition, the laser beam (such as blue light) may also directly pass through the phosphor wheel through a hollow slot on the metal substrate or a light-transmitting plate disposed on the metal substrate, so as to generate various colored lights.

In order for the phosphor wheel to rotate smoothly, a counterweight element may be disposed on it. The counterweight element may be fixed on the phosphor wheel through adhering, and the adhesive material used may be a light-curing adhesive, which has a short curing time and good production efficiency. However, when light-curing the light-curable adhesive, due to structural factors such as the blocking of the counterweight element, the penetration rate and/or irradiation range of the UV light to the adhesive is insufficient, resulting in an incomplete curing of the adhesive and therefore it is difficult to firmly fix the counterweight element to the phosphor wheel.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a wavelength conversion device and a manufacturing method thereof, which may firmly dispose the counterweight element on the main body of the wavelength conversion device.

The other objectives and advantages of the present invention may be further understood from the descriptive features disclosed in the present invention.

In order to achieve one of, or portions of, or all of the above objectives or other objectives, an embodiment of the invention provides a wavelength conversion device. The wavelength conversion device is adapted for rotating with a central axis as a rotation axis, and includes a main body, at least one counterweight element, and at least one adhesive. The main body has a first surface, a second surface, multiple through holes, and a recess. The first surface is opposite to the second surface, the recess is located on the central axis and is recessed into the main body relative to the first surface, and the recess has a blocking surface surrounding the central axis. The through holes are disposed in the recess at intervals and penetrate from the first surface to the second surface along a direction parallel to the central axis. The blocking surface is adjacent to the first surface and the through holes, and the blocking surface has multiple segments, the segments are, respectively, partial inner walls of the through holes. The counterweight element is disposed in the recess, the counterweight element is supported by the blocking surface and is positioned by at least one of the segments of the blocking surface, and an orthographic projection of the through hole corresponding to at least one of the segments on the second surface in a direction parallel to the central axis at least partially overlaps an orthographic projection of the counterweight element on the second surface in the direction parallel to the central axis. The adhesive at least partially covers the counterweight element to adhere the counterweight element to the main body.

A manufacturing method of a wavelength conversion device includes the following process. A base material is provided, in which the base material has a central axis, and a first surface and a second surface opposite to each other. Multiple through holes and a recess are formed in the base material. The recess is located on the central axis and is recessed into the base material relative to the first surface, the recess has a blocking surface surrounding the central axis, and the through holes are disposed in the recess at intervals and penetrate from the first surface to the second surface along a direction parallel to the central axis. The blocking surface is adjacent to the first surface and the through holes, and the blocking surface has multiple segments, the segments are, respectively, partial inner walls of the through holes. At least one counterweight element is disposed in the recess, the at least one counterweight element is supported by the blocking surface and is positioned by at least one of the segments of the blocking surface, and an orthographic projection of the through hole corresponding to at least one of the segments on the second surface in a direction parallel to the central axis at least partially overlaps an orthographic projection of the at least one counterweight element on the second surface in the direction parallel to the central axis. At least one adhesive is covered on the at least one counterweight element. The at least one adhesive is light-cured toward a direction of the first surface, and the at least one adhesive is light-cured toward a direction of the second surface through the through holes corresponding to at least one of the segments.

Based on the above, the embodiments of the invention have at least one of the following advantages or effects. The main body of the wavelength conversion device is formed with through holes and a recess, and the counterweight element is supported by and is positioned at the blocking surface of the recess and overlaps the through holes. Thereby, when the adhesive covering the counterweight element is light-cured, the UV light may not only irradiate the adhesive in the direction of the first surface, but also irradiate the adhesive in the direction of the second surface through the through holes, so as to improve the efficiency and integrity of light-curing. Thus, the counterweight element may be firmly fixed to the main body of the wavelength conversion device by the adhesive.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWING

The accompanying drawings are included to provide a further understanding of the invention, and are incorporated in and constitute a part of this specification. The drawings illustrate embodiments of the invention and, together with the description, serve to explain the principles of the invention.

FIG. 16A to FIG. 16D, FIG. 17A to FIG. 17C, and FIG. 18A to FIG. 18D schematically illustrate specific steps of the manufacturing method of a wavelength conversion device of another embodiment of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
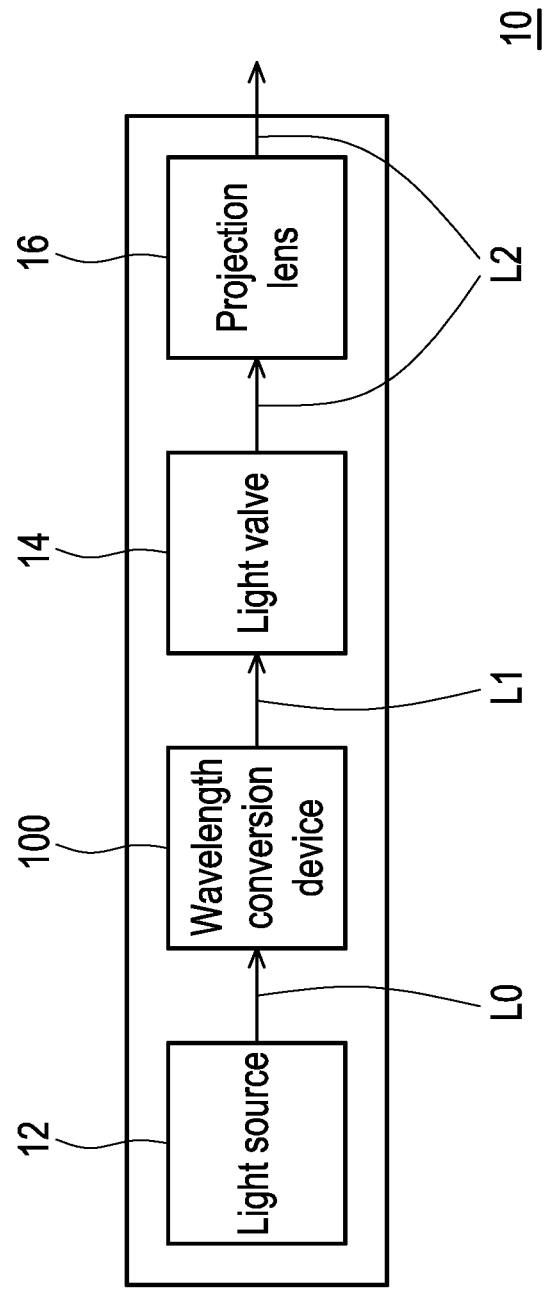
FIG. 1 is a schematic diagram of a projector according to an embodiment of the invention.

FIG. 1 is a schematic diagram of a projector according to an embodiment of the invention. Referring to FIG. 1, the projector 10 of this embodiment includes a light source 12, a wavelength conversion device 100, a light valve 14, and a projection lens 16. The light source 12 includes, for example, a laser light-emitting element and is adapted for providing a laser beam L0. The wavelength conversion device 100 is, for example, a phosphor wheel and is configured with a wavelength conversion area and a non-wavelength conversion area, so that the wavelength conversion area and the non-wavelength conversion area alternately moves into the transmission path of the laser beam L0 from the light source 12. When the wavelength conversion area is located on the transmission path of the laser beam L0, the wavelength of the laser beam L0 may be converted and converted beams with different wavelengths are generated. When the non-wavelength conversion area is located on the transmission path of the laser beam L0, the laser beam L0 may penetrate the non-wavelength conversion area or be reflected by the non-wavelength conversion area.

At least one of the laser beam L0 and the converted beam exiting the wavelength conversion device 100 forms an illumination beam L1. The light valve 14 is adapted to convert the illumination beam L1 from the wavelength conversion device 100 into an image light beam L2, and the projection lens 16 is adapted to project the image light beam L2 out of the projector 10.

Figure 2:
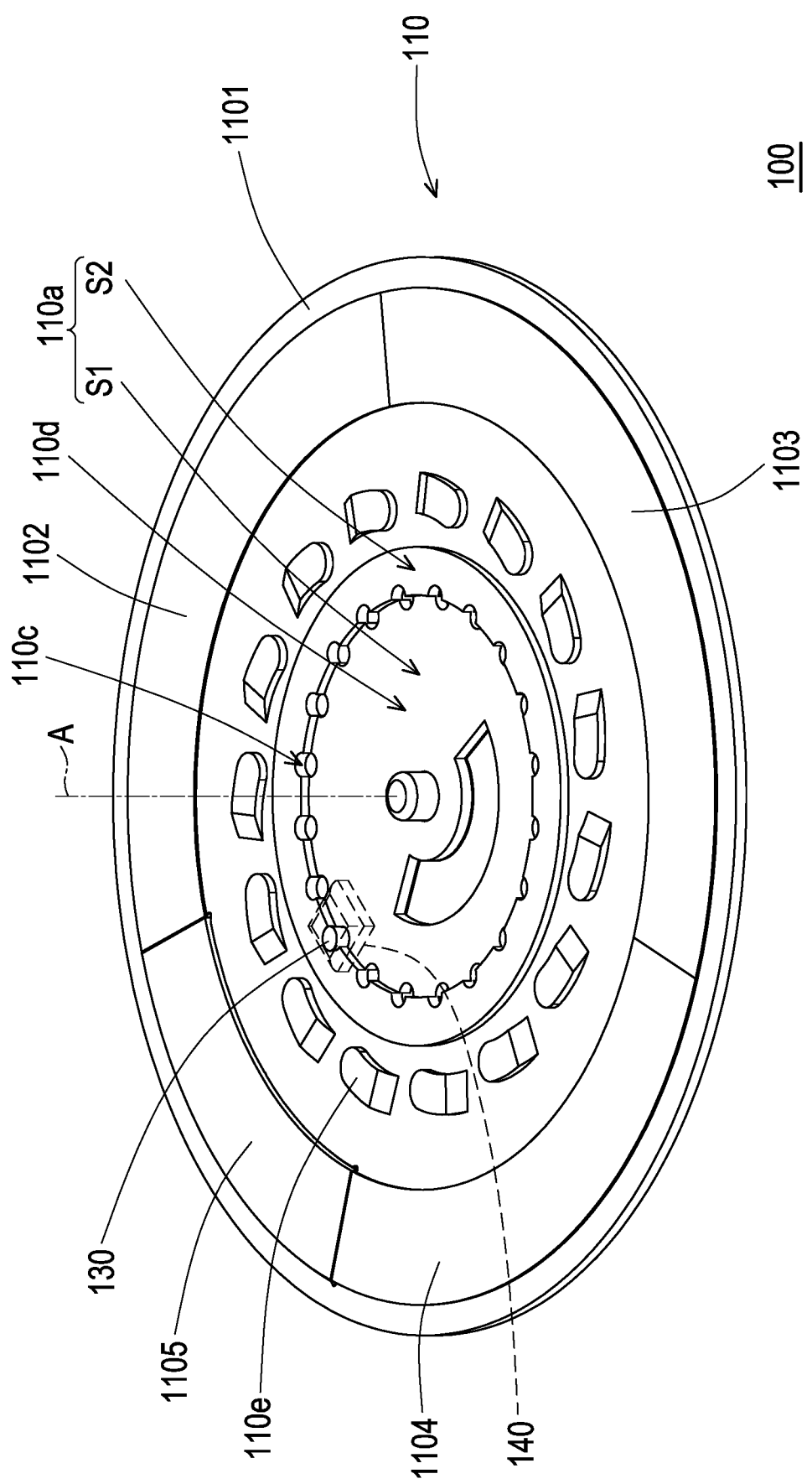
FIG. 2 is a three-dimensional diagram of the wavelength conversion device of FIG. 1.
Figure 3:
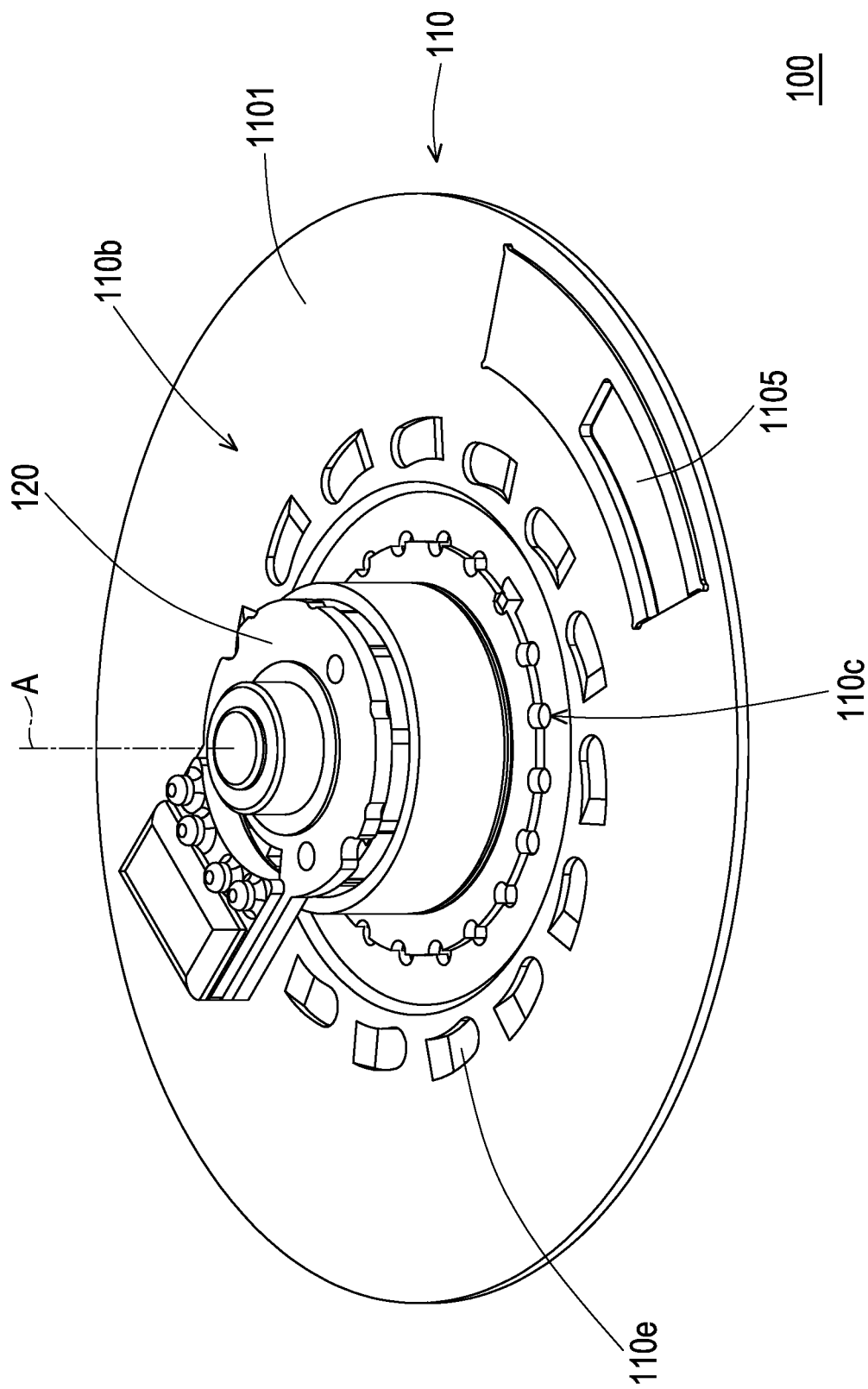
FIG. 3 is a three-dimensional diagram of the wavelength conversion device of FIG. 2 from another viewing angle.

FIG. 2 is a three-dimensional diagram of the wavelength conversion device of FIG. 1. FIG. 3 is a three-dimensional diagram of the wavelength conversion device of FIG. 2 from another viewing angle. Referring to FIG. 2 and FIG. 3, the wavelength conversion device 100 of this embodiment includes a main body 110 and a driving unit 120. The main body 110 has a first surface 110a, a second surface 110b, multiple through holes 110c, and a recess 110d. The main body 110 includes a substrate 1101, and a wavelength conversion area and a non-wavelength conversion area (not numbered) disposed on the substrate 1101. The wavelength conversion area and the non-wavelength conversion area together form a complete ring and surround the central axis A of the substrate 1101. The wavelength conversion area includes at least one wavelength conversion layer (shown as multiple wavelength conversion layers 1102, 1103, and 1104), and the non-wavelength conversion area includes a reflective layer 1105 or an opening (not shown). In the non-wavelength conversion area of this embodiment, the reflective layer 1105 is disposed on the substrate 1101, or glass is disposed in the opening of the substrate 1101 and the reflective layer 1105 is disposed on the glass. In this embodiment, the material of the substrate 1101 may include aluminum or other suitable materials, and the first surface 110a and the second surface 110b are opposite surfaces of the substrate 1101. As shown in FIG. 1 and FIG. 2, the first surface 110a of the substrate 1101 is, for example, the surface facing the light source 10. The wavelength conversion layers 1102, 1103, and 1104 and the reflective layer 1105 are disposed on the first surface 110a of the substrate 1101. The driving unit 120 is, for example, a motor, and is disposed on the second surface 110b of the main body 110, which is used to drive the substrate 1101 to rotate around the central axis A as the rotation axis, so that the wavelength conversion layers 1102, 1103, and 1104 and the reflective layer 1105 are sequentially moved around the central axis A to the transmission path of the laser beam L0 shown in FIG. 1, therefore, the wavelength conversion layers 1102, 1103, and 1104 may convert the wavelength of the laser beam L0, and the reflection layer 1105 may reflect the laser beam L0. In other embodiments, the non-wavelength conversion area is, for example, an opening of the substrate 1101, and a light-transmitting glass may be disposed in the opening. When the substrate 1101 of the wavelength conversion device 100 rotates with the central axis A as the rotation axis, the laser beam L0 penetrates the non-wavelength conversion area (an opening or a light-transmitting glass disposed in the opening).

Figure 4:
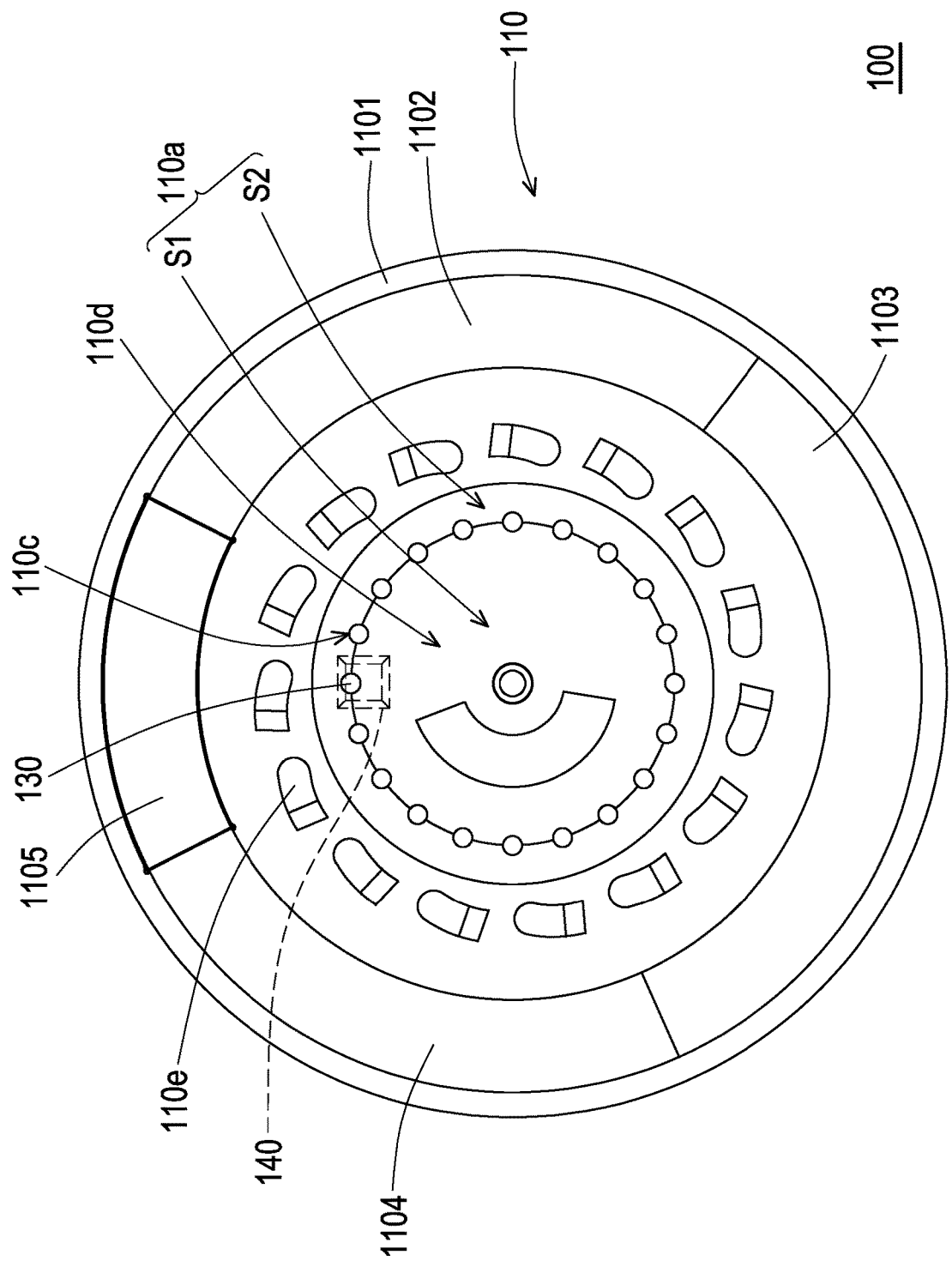
FIG. 4 is a front-view diagram of the wavelength conversion device of FIG. 2.
Figure 5:
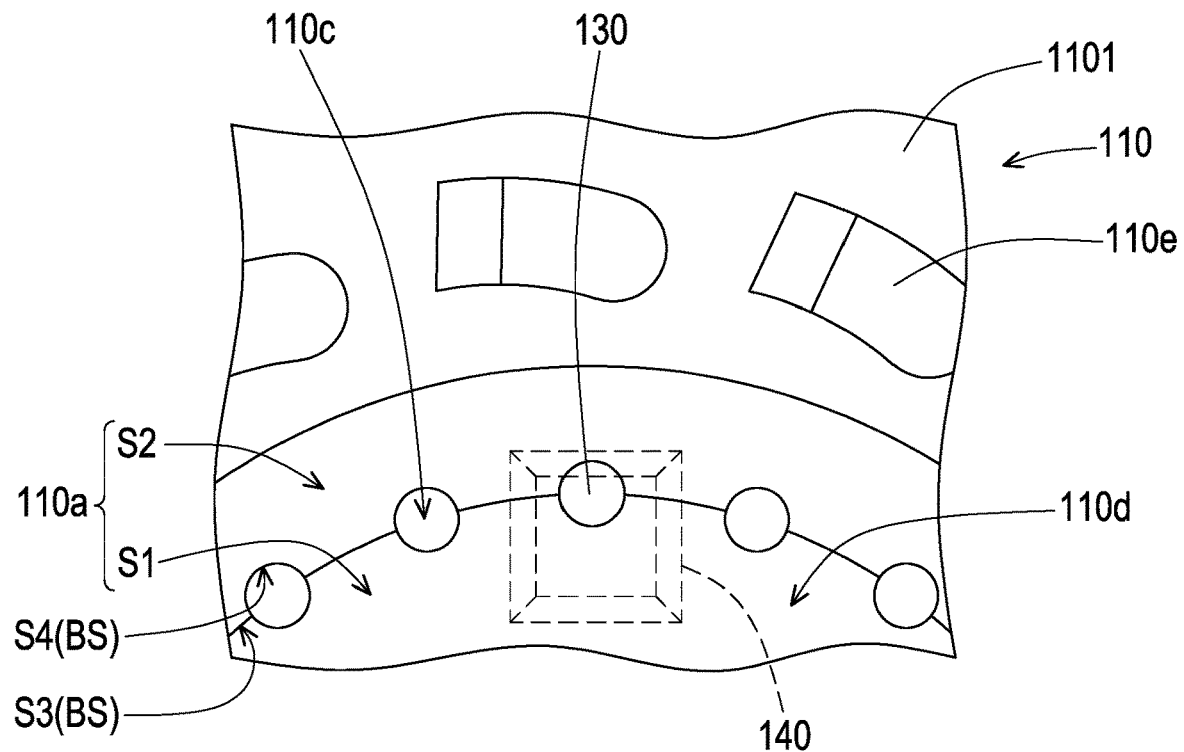
FIG. 5 is a partial enlarged diagram of the wavelength conversion device of FIG. 4.
Figure 6:
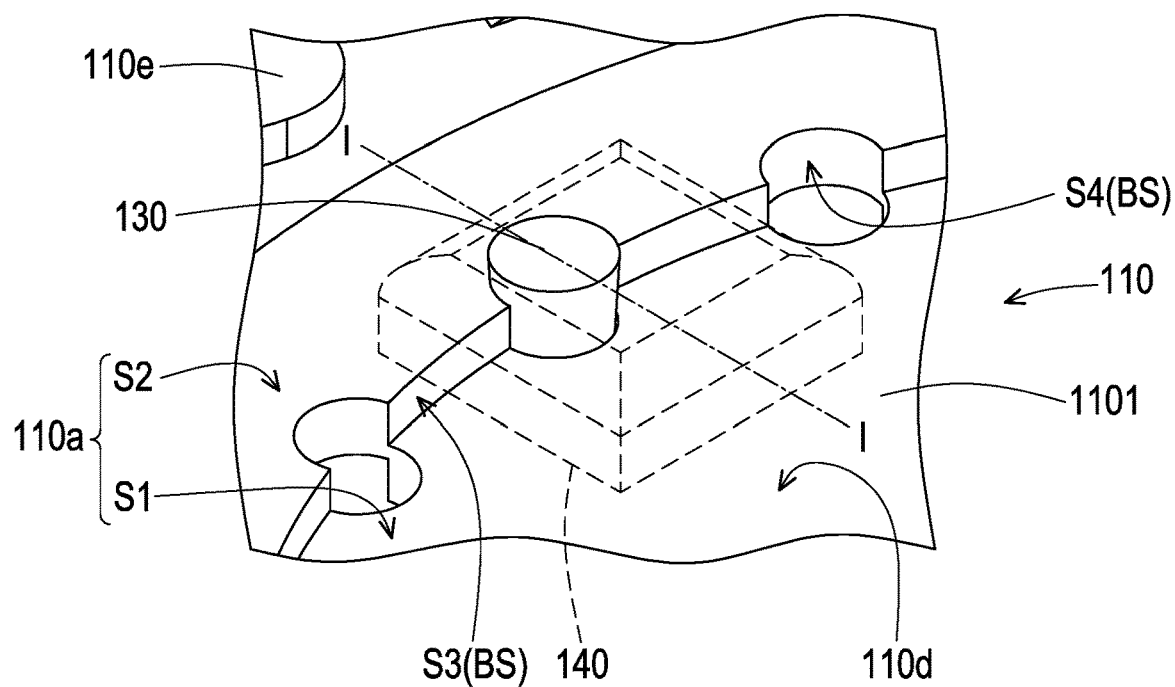
FIG. 6 is a three-dimensional diagram of the wavelength conversion device of FIG. 5.

FIG. 4 is a front-view diagram of the wavelength conversion device of FIG. 2. FIG. 5 is a partial enlarged diagram of the wavelength conversion device of FIG. 4. FIG. 6 is a three-dimensional diagram of the wavelength conversion device of FIG. 5. Referring to FIG. 2 and FIG. 4 to FIG. 6, the wavelength conversion device 100 of the present embodiment further includes at least one counterweight element 130 (shown as one) and at least one adhesive 140 (shown as one), the material of the at least one counterweight element 130 may be copper or stainless steel, or the at least one counterweight element 130 may be made of other high-density materials. The substrate 1101 has multiple through holes 110c and a recess 110d. The recess 110d is located on the central axis A and is recessed into the substrate 1101 of the main body 110 relative to the first surface 110a, the wavelength conversion layers 1102, 1103, and 1104 and the reflective layer 1105 surround the recess 110d, and the recess 110d has a blocking surface BS surrounding the central axis A. The through holes 110c are disposed in the recess 110d at intervals and penetrate from the first surface 110a to the second surface 110b of the substrate 1101 in a direction parallel to the central axis A (labeled in FIG. 3).

The blocking surface BS is adjacent to the first surface 110a and the through holes 110c and is inclined or perpendicular to the first surface 110a, and the blocking surface BS has multiple segments S4. These segments S4 are, respectively, the partial inner walls of the through holes 110c. The counterweight element 130 is disposed in the recess 110d, and the counterweight element 130 is supported by the blocking surface BS and is positioned by at least one of the segments S4 of the blocking surface BS. In this embodiment, the counterweight element 130 is positioned at a segment S4 of the blocking surface BS (i.e., a partial inner wall of a through hole 110c), and an orthographic projection of the through hole 110c corresponding to the segment S4 on the second surface 110b in a direction parallel to the central axis A at least partially overlaps an orthographic projection of the counterweight element 130 on the second surface 110b in the direction parallel to the central axis A. The adhesive 140 is, for example, a light-curing adhesive, which at least partially covers the counterweight element 130 to adhere the counterweight element 130 to the main body 110. In other embodiments, the adhesive 140 may be a thermally-cured adhesive, a room temperature-cured adhesive, or other types of adhesives.

As described above, the main body 110 of the wavelength conversion device 100 is formed with through holes 110c and a recess 110d, and the counterweight element 130 is supported by and is positioned at the blocking surface BS of the recess 110d and overlaps the through holes 110c. Therefore, when the adhesive 140 covering the counterweight element 130 is light-cured, the UV light (ultraviolet light) may not only irradiate the adhesive 140 in the direction of the first surface 110a of the substrate 1101, but also may irradiate the adhesive 140 in the direction of the second surface 110b through the through holes 110c, so as to improve the efficiency and integrity of light-curing the adhesive 140. Thus, the counterweight element 130 may be firmly fixed on the main body 110 of the wavelength conversion device 100 by the adhesive 140.

Furthermore, in this embodiment, the counterweight element 130 is located between the blocking surface BS and the central axis A in the radial direction of the substrate 1101. Therefore, when the substrate 1101 rotates with the central axis A as the rotation axis, the centrifugal force generated by the counterweight element 130 is directed from the central axis A to the blocking surface BS, so that the counterweight element 130 may be blocked by the blocking surface BS. This prevents the centrifugal force from separating the counterweight element 130 from the substrate 1101.

Figure 7:
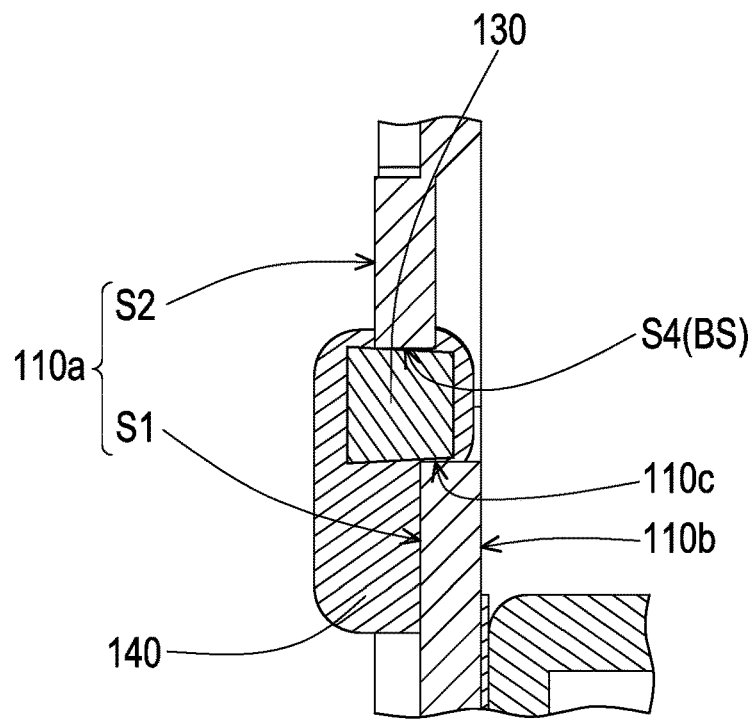
FIG. 7 is a cross-sectional diagram of the wavelength conversion device of FIG. 6 along a line I-I.
Figure 8:
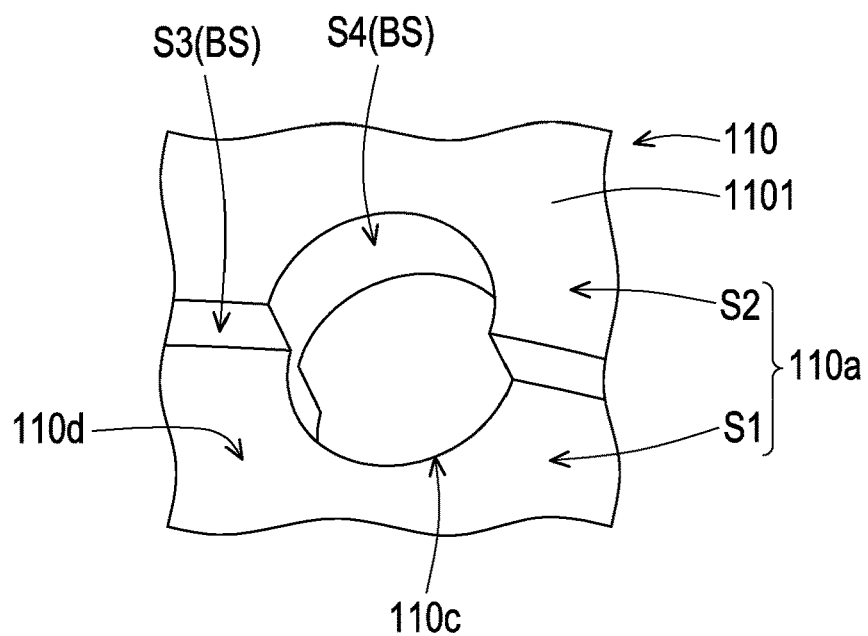
FIG. 8 is a partial enlarged diagram of the substrate of FIG. 6.

FIG. 7 is a cross-sectional diagram of the wavelength conversion device of FIG. 6 along a line I-I. FIG. 8 is a partial enlarged diagram of the substrate of FIG. 6. Referring to FIG. 6 to FIG. 8, the first surface 110a of this embodiment includes a first step surface S1 and a second step surface S2. The first step surface S1 is, for example, the bottom surface of the recess 110d, and the blocking surface BS is connected between the first step surface S1 and the second step surface S2 so that the first surface 110a and the blocking surface BS form a stepped structure. In addition, the blocking surface BS of this embodiment includes multiple first arc surfaces S3 and multiple second arc surfaces which are disposed in a staggered manner. The second arc surfaces are the aforementioned segments S4 of the blocking surface BS, that is, the partial inner walls of the through holes 110c (the inner walls facing the central axis A). The radius of curvature of each of the second arc surfaces (segments S4) is smaller than the radius of curvature of each of the first arc surfaces S3. The counterweight element 130 is disposed on the first step surface S1 and is supported by at least one of the second arc surfaces (segments S4). Specifically, the counterweight element 130 in the present embodiment is conical, and the cross-sectional diameter of the conical counterweight element 130 in the radial direction of the substrate increases gradually along the direction from the second surface 110b to the first surface 110a, and as shown in FIG. 7, the conical counterweight element 130 partially extends into the through hole 110c and is positioned at the through hole 110c, and abuts against the second arc surface (segment S4) of the through hole 110C.

In this embodiment, the number of the through holes 110c is greater than the number of the counterweights 130. Therefore, the counterweight 130 and the adhesive 140 are not disposed at some of the through holes 110c. That is, the counterweight element 130 and the adhesive 140 only cover one or more of the through holes 110c but not all of the through holes 110c, and the remaining through holes 110c are not covered by the counterweight element 130 and the adhesive 140. Therefore, the airflow generated when the substrate 1101 rotates may flow through the through holes 110c that are not covered by the counterweight 130 and the adhesive 140, thereby improving the heat dissipation efficiency of the substrate 1101. In addition, the substrate 1101 may further have multiple heat dissipation structures 110e to increase the heat dissipation area and generate turbulence, so as to further improve the heat dissipation efficiency of the substrate 1101. In this embodiment, the heat dissipation structures 110e are disposed at intervals and surround the central axis A of the substrate 1101, and is located between the wavelength conversion layers 1102, 1103, and 1104 and the through holes 110c in the radial direction. The heat dissipation structures 110e are, for example, protruding or recessed structures relative to the first surface 110a of the substrate 1101. With the aforementioned heat dissipation design of this embodiment, for example, the heat dissipation efficiency may be improved by about 10%, the temperature of the wavelength conversion device 100 may be lowered by about 10 degrees Celsius to 20 degrees Celsius, and the wavelength conversion efficiency may be improved by about 5% to 8%.

Figure 9:
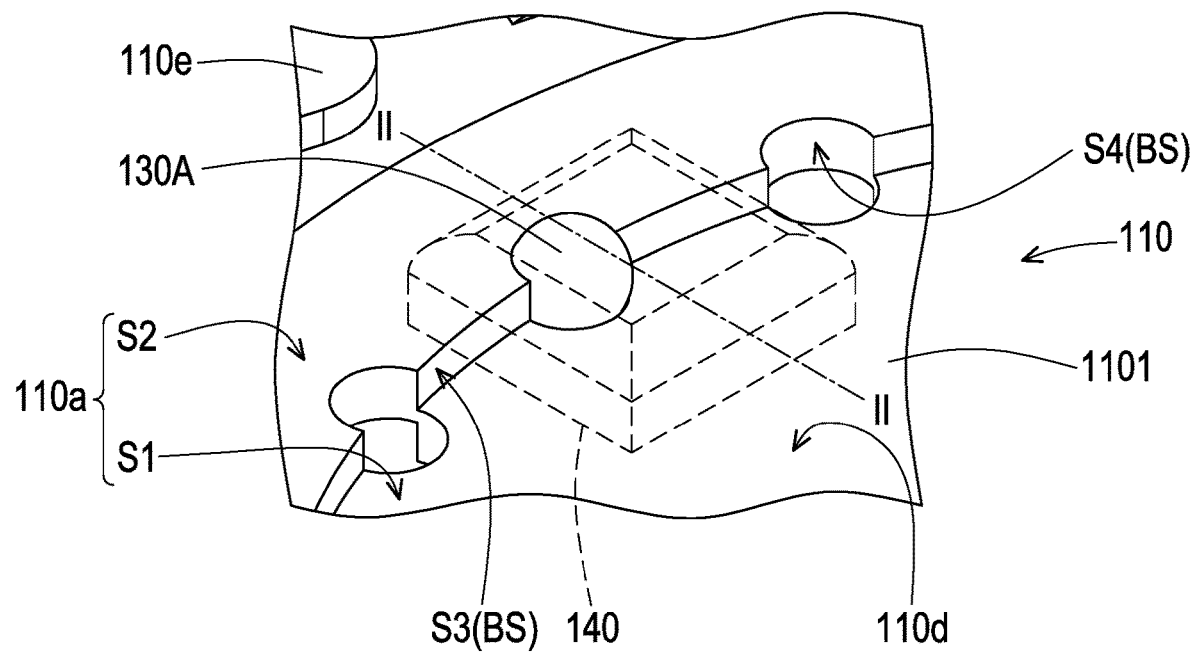
FIG. 9 is a partial three-dimensional diagram of a wavelength conversion device according to another embodiment of the invention.
Figure 10:
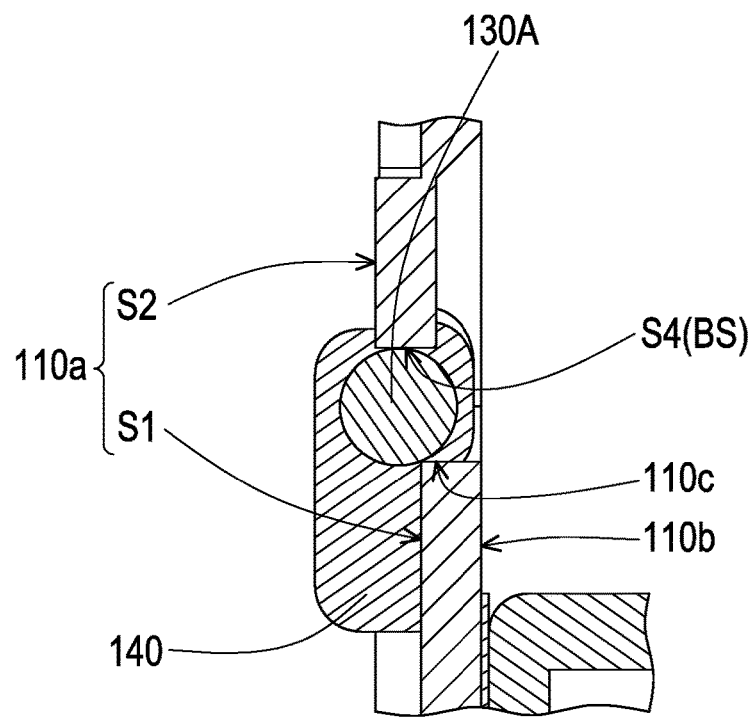
FIG. 10 is a cross-sectional diagram of the wavelength conversion device of FIG. 9 along a line II-II.

FIG. 9 is a partial three-dimensional diagram of a wavelength conversion device according to another embodiment of the invention. FIG. 10 is a cross-sectional diagram of the wavelength conversion device of FIG. 9 along a line II-II. The main difference between the embodiment shown in FIG. 9 and FIG. 10 and the previous embodiment is that the counterweight element 130A shown in FIG. 9 and FIG. 10 is spherical instead of conical as shown in FIG. 6 and FIG. 7. The counterweight element 130A of the first embodiment partially extends into the through hole 110c and is positioned at the through hole 110c, and abuts against the second arc surface (segment S4) of the through hole 110C.

Figure 11:
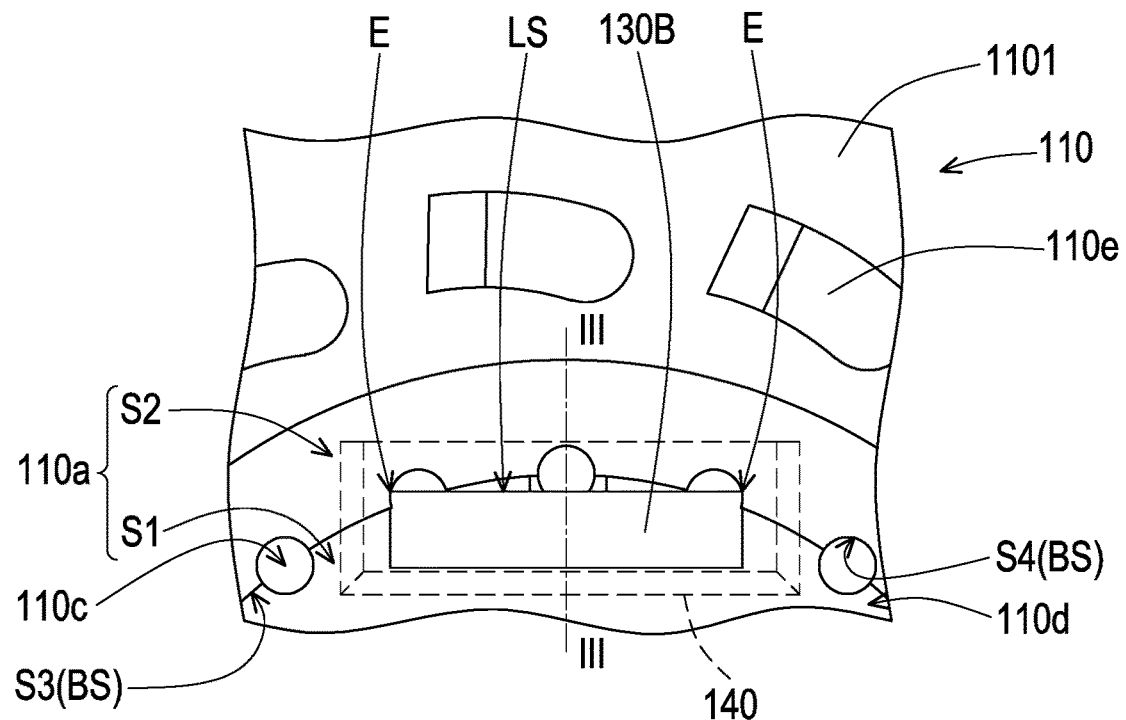
FIG. 11 is a partial front-view diagram of a wavelength conversion device according to another embodiment of the invention.
Figure 12:
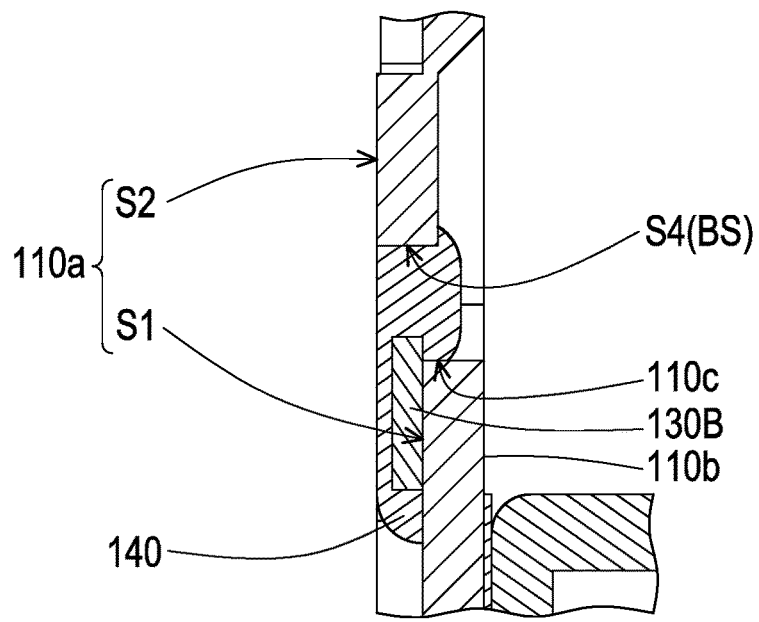
FIG. 12 is a cross-sectional diagram of the wavelength conversion device of FIG. 11 along a line III-III.

FIG. 11 is a partial front-view diagram of a wavelength conversion device according to another embodiment of the invention. FIG. 12 is a cross-sectional diagram of the wavelength conversion device of FIG. 11 along a line III-III. The main difference between the embodiment shown in FIG. 11 and FIG. 12 and the previous embodiments is that the counterweight element 130B shown in FIG. 11 and FIG. 12 is sheet-shaped, instead of conical as shown in FIG. 6 and FIG. 7 or spherical as shown in FIG. 9 and FIG. 10. The sheet-shaped counterweight element 130B includes a side surface LS and the side surface LS has two edges E on both ends. The sheet-shaped counterweight element 130B not only is supported by the two second arc surfaces (segments S4) with the two edges E of its side surface LS, but also is supported by the junction of the two first arc surfaces S3 and the adjacent second arc surface (segment S4) with its side surface LS.

Figure 13:
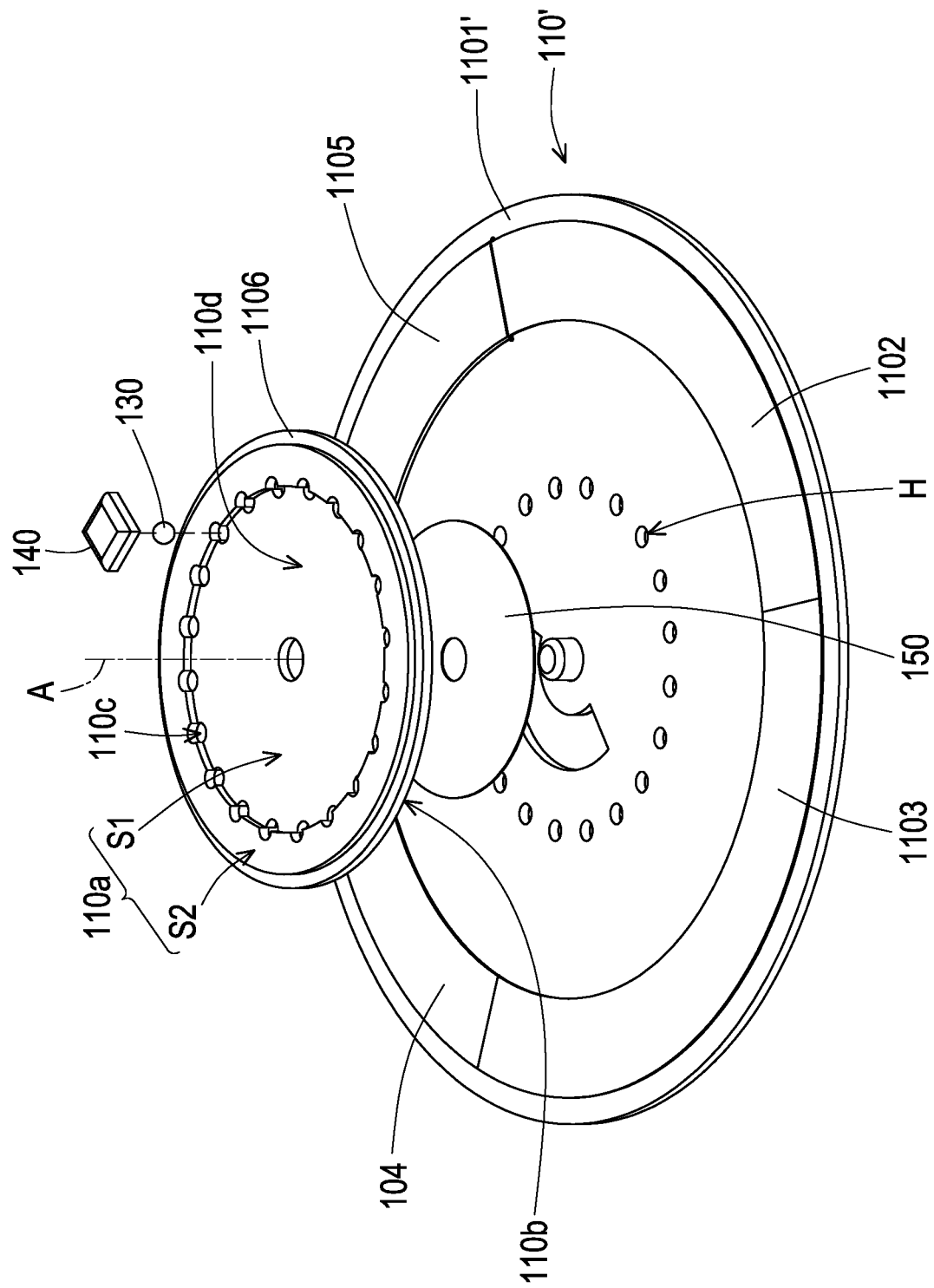
FIG. 13 is an exploded diagram of a wavelength conversion device according to another embodiment of the invention.

FIG. 13 is an exploded diagram of a wavelength conversion device according to another embodiment of the invention. The main difference between the embodiment shown in FIG. 13 and the previous embodiments is that the main body 110' shown in FIG. 13 includes a substrate 1101' and a counterweight plate 1106. The first surface 110a and the second surface 110b of the main body 110' are opposite surfaces of the counterweight plate 1106. As shown in FIG. 1 and FIG. 13, the first surface 110a of the counterweight plate 1106 is, for example, the surface facing the light source 10. The counterweight plate 1106 is disposed on the substrate 1101' and is located on the central axis A. The wavelength conversion layers 1102 to 1104 and the reflection layer 1105 are disposed on the substrate 1101' and are located on the same side of the substrate 1101' as the counterweight plate 1106 and surround the counterweight plate 1106. The counterweight plate 1106 is fixed on the substrate 1101' by adhering, for example, by using a binding adhesive 150, or fixed on the substrate 1101' by other suitable methods, which is not limited in the invention. The through hole 110c and the recess 110d of the main body 110' are formed in the counterweight plate 1106, and their disposition and function are the same as or similar to those in the foregoing embodiments, and are not described herein again. In addition, the substrate 1101' of this embodiment has multiple openings H, the openings H are disposed at intervals and surround the central axis A. The through holes 110c correspond to the openings H one-to-one, and the orthographic projections of the through holes 110c on the second surface 110b in the direction parallel to the central axis A at least partially overlap the orthographic projections of the openings H on the second surface 110b in the direction parallel to the central axis A. Therefore, the airflow generated when the substrate 1101 rotates may flow through the corresponding uncovered through holes 110c through the openings H, thereby improving the heat dissipation efficiency of the substrate 1101'.

The manufacturing method of the wavelength conversion device according to the embodiment of the invention is described below.

Figure 14:
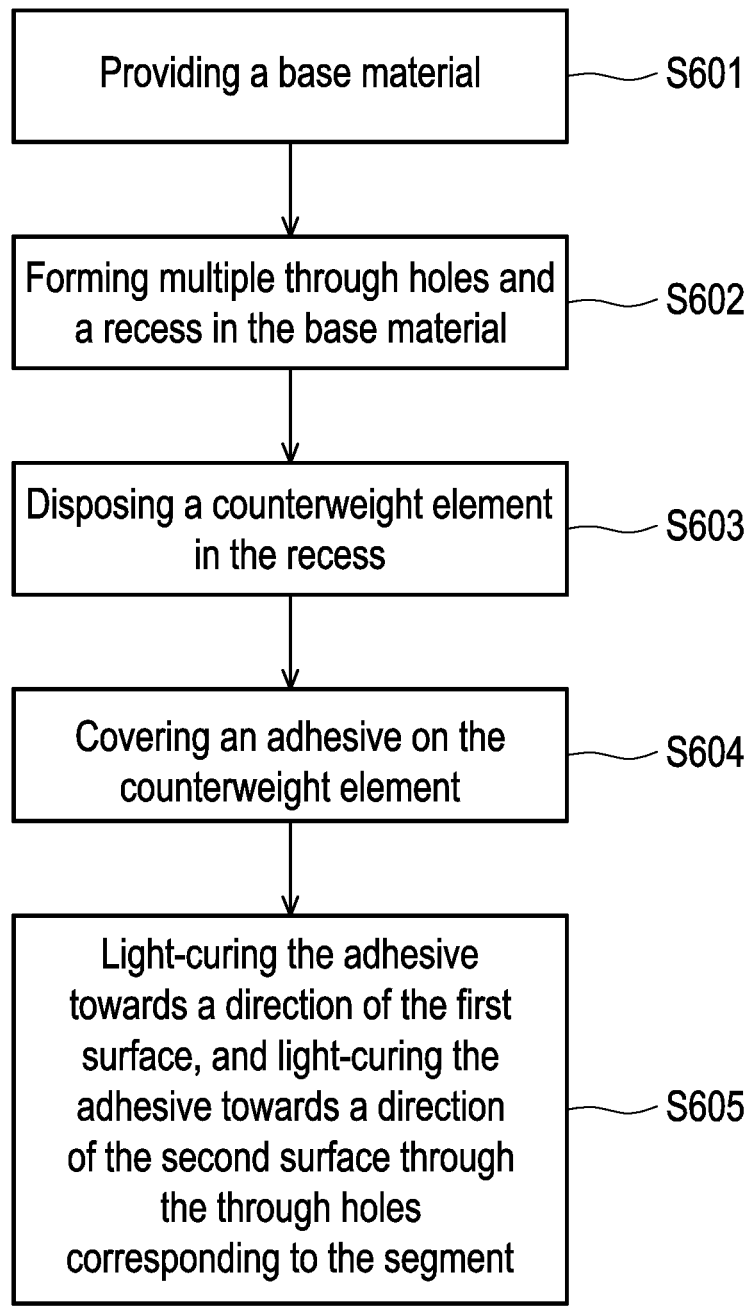
FIG. 14 is a flowchart of a manufacturing method of a wavelength conversion device according to an embodiment of the invention.
Figure 15A:
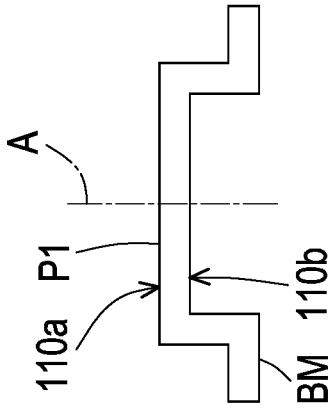
FIG. 15A to FIG. 15H schematically illustrate specific steps of the manufacturing method of FIG. 14.
Figure 15B:
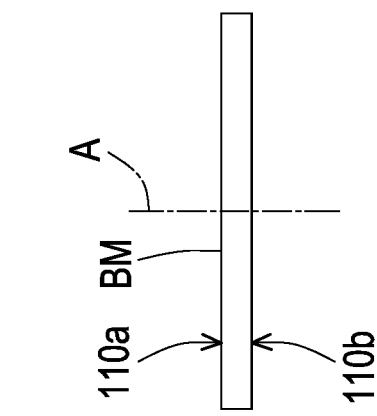
Figure 15C:
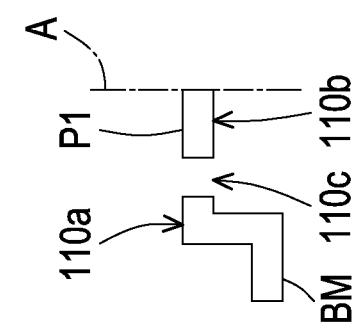
Figure 15D:
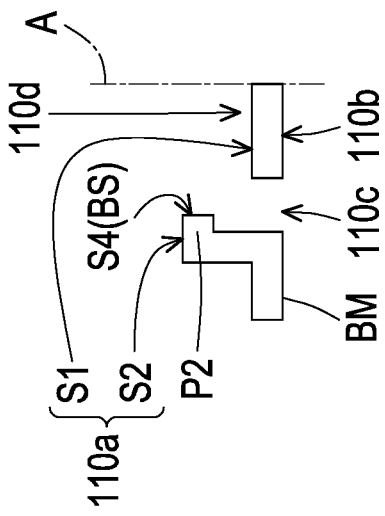
Figure 15E:
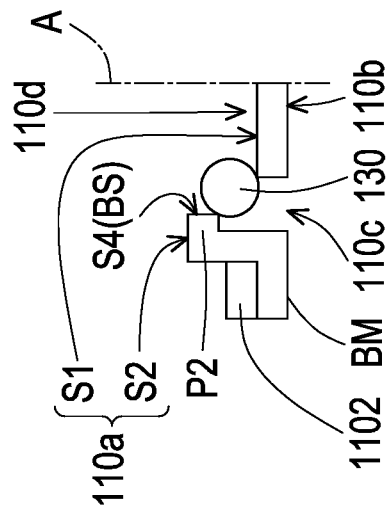

FIG. 14 is a flowchart of a manufacturing method of a wavelength conversion device according to an embodiment of the invention. FIG. 15A to FIG. 15H schematically illustrate specific steps of the manufacturing method of FIG. 14. Referring to FIG. 14 and FIG. 15A to FIG. 15H, firstly, as shown in FIG. 15A, a base material BM is provided (step S601). The base material BM has a central axis A, and a first surface 110a and a second surface 110b opposite to each other. Next, as shown in FIG. 15B to FIG. 15D, multiple through holes 110c and a recess 110d are formed in the base material BM (step S602). The recess 110d is located on the central axis A and is recessed into the base material BM relative to the first surface 110a. In addition, as shown in FIG. 6 to FIG. 8 of the previous embodiment, the recess 110d formed in step S602 has a blocking surface BS surrounding the central axis A, and the through holes 110c are disposed in the recess 110d at intervals and penetrate from the first surface 110a to the second surface 110b of the base material BM along a direction parallel to the central axis A. The blocking surface BS is adjacent to the first surface 110a and the through holes 110c, and the blocking surface BS has multiple segments S4. The segments S4 are, respectively, partial inner walls of the through holes 110c.

Specifically, in the aforementioned step S602, as shown in FIG. 15B, the base material BM is stamped along the direction from the second surface 110b to the first surface 110a, to form a protruding platform structure P1 on the base material BM. Next, as shown in FIG. 15C, the through holes 110c are formed in the protruding platform structure P1 along a direction parallel to the central axis A. As shown in FIG. 15D, the protruding platform structure P1 is stamped along the direction from the first surface 110a to the second surface 110b to form a recess 110d in the central area of the protruding platform structure P1 and an annular protruding portion P2 at the periphery of the protruding platform structure P1. The side surface of the recess 110d forms the blocking surface BS, the bottom surface of the recess 110d is the first step surface S1, the top surface of the annular protruding portion P2 is the second step surface S2, and the blocking surface BS is connected between the first step surface S1 and the second step surface S2. The through holes 110c are located at the junction of the first step surface S1 and the blocking surface BS, and the first surface 110a and the blocking surface BS form a stepped structure. The blocking surface BS and the first surface 110a are, for example, perpendicular to each other, or the blocking surface BS is relatively inclined to the first surface 110a, which is not limited in the invention. In addition, as shown in FIG. 6 to FIG. 8 of the previous embodiment, the blocking surface BS formed in step S602 includes multiple first arc surfaces S3 and multiple second arc surfaces (segments S4) disposed in a staggered manner. The radius of curvature of each of the second arc surfaces (segment S4) is smaller than the radius of curvature of each of the first arc surfaces S3. So far, the base material BM forms the substrate of the wavelength conversion device 100 of the foregoing embodiment (such as the substrate 1101 shown in FIG. 2). In addition, after step S602 is completed, a wavelength conversion layer (labeled as wavelength conversion layer 1102 in FIG. 15E) may be disposed on the substrate 1101, so that the wavelength conversion layer surrounds the outer side of at least a portion of the recess 110d.

Figure 15F:
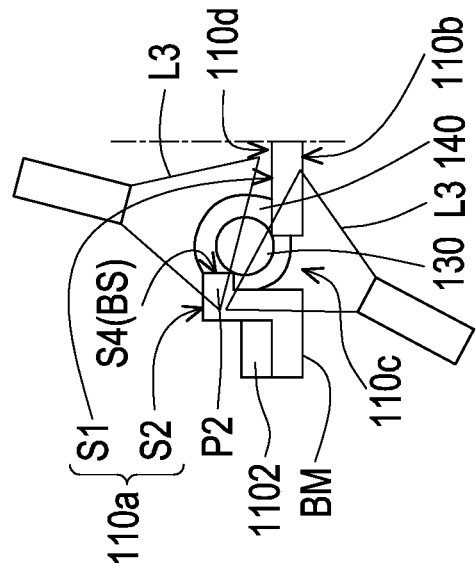
Figure 15G:
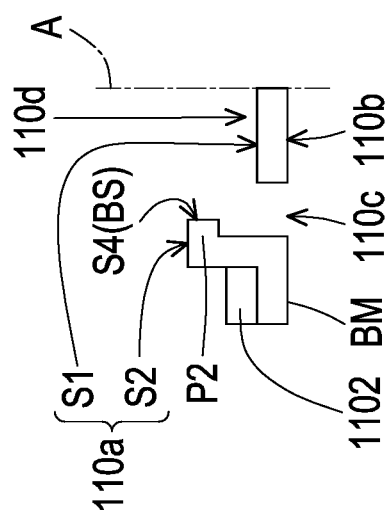
Figure 15H:
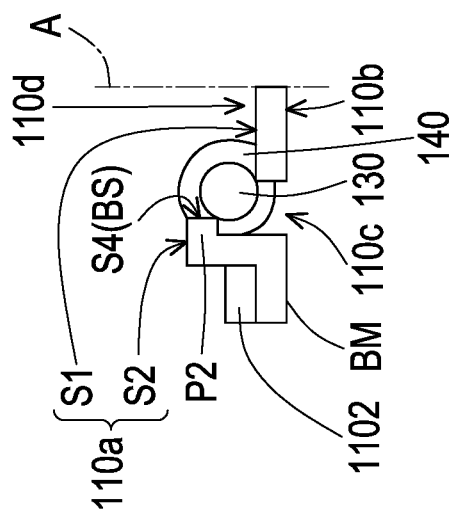

After the fabrication of the substrate 1101 and the disposition of the wavelength conversion layer are completed, the counterweight element 130 is disposed in the recess 110d as shown in FIG. 15F (step S603), so that the counterweight element 130 is supported by the second arc surface (segment S4) of the blocking surface BS and is positioned by the second arc surface (segment S4) of the blocking surface BS. The orthographic projection of the through hole 110c corresponding to the segment S4 on the second surface 110b in a direction parallel to the central axis A at least partially overlaps the orthographic projection of the counterweight element 130 on the second surface 110b in the direction parallel to the central axis A. Next, as shown in FIG. 15G, the adhesive 140, such as a light-curable adhesive, is covered on the counterweight element 130 (step S604). As shown in FIG. 15H, the adhesive 140 is light-cured by UV light L3 from a UV light source (not numbered) toward the first surface 110a. At the same time, the UV light L3 from another UV light source (not numbered) passes through the through hole 110c corresponding to the segment S4 toward the second surface 110b to light-cure the adhesive 140 (step S605). In the aforementioned steps S603 to S605, the number of the through holes 110c is greater than the number of the counterweights 130. Therefore, the counterweight 130 and the adhesive 140 are not disposed in multiple through holes 110c. That is, the counterweight element 130 and the adhesive 140 only cover a portion of the through holes 110c, and the remaining through holes 110c are not covered by the counterweight element 130 and the adhesive 140.

Another manufacturing method of the wavelength conversion device according to the embodiment of the invention is described below.

Figure 16B:
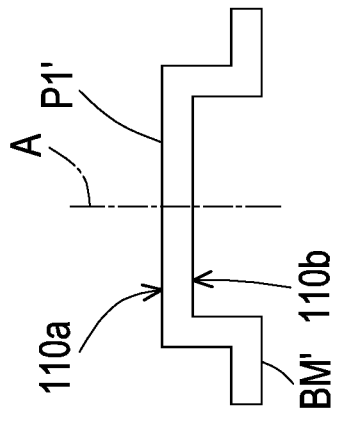
Figure 16D:
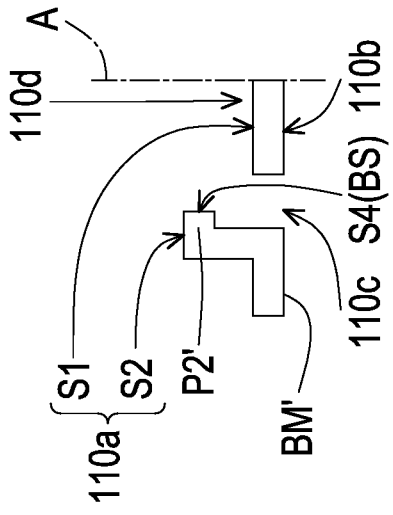
Figure 16A:
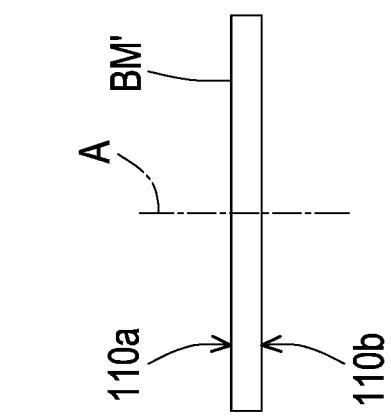
Figure 16C:
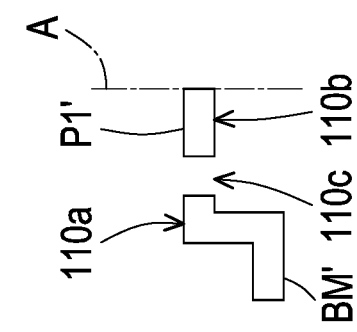

FIG. 16A to FIG. 16D, FIG. 17A to FIG. 17C, and FIG. 18A to FIG. 18D schematically illustrate specific steps of the manufacturing method of a wavelength conversion device of another embodiment of the invention. Firstly, as shown in FIG. 16A, a base material BM' is provided, and the base material BM' has a central axis A, and a first surface 110a and a second surface 110b opposite to each other. Next, as shown in FIG. 16B, the base material BM' is stamped along the direction from the second surface 110b to the first surface 110a, to form a protruding platform structure P1' on the base material BM'. Next, as shown in FIG. 16C, the through holes 110c are formed in the protruding platform structure P1' along a direction parallel to the central axis A. As shown in FIG. 16D, the protruding platform structure P1' is stamped along the direction from the first surface 110a to the second surface 110b to form a recess 110d in the central area of the protruding platform structure P1' and an annular protruding portion P2' at the periphery of the protruding platform structure P1'. The specific structures of the recess 110d and the through hole 110c formed here are the same or similar to those formed in step S602 of FIG. 14, and are not described herein again. So far, the base material BM' forms the counterweight plate 1106 of the wavelength conversion device of the foregoing embodiment.

On the other hand, as shown in FIG. 17A, a substrate 1101' is provided, and as shown in FIG. 17B, multiple openings H are formed in the substrate 1101'. Next, as shown in FIG. 17C, the wavelength conversion layer (labeled as the wavelength conversion layer 1102) is disposed on the substrate 1101'. Then, as shown in FIG. 18A, the counterweight plate 1106 in FIG. 16D is disposed on the substrate 1101', so that the counterweight plate 1106 is located on the central axis A, and the wavelength conversion layer (labeled as the wavelength conversion layer 1102) surrounds the outer side of at least a portion of the recess 110d. In addition, the through holes 110c correspond to the openings H one-to-one, and the orthographic projections of the through holes 110c on the second surface 110b in the direction parallel to the central axis A at least partially overlap the orthographic projections of the openings H on the second surface 110b in the direction parallel to the central axis A.

As shown in FIG. 18B, the counterweight element 130 is disposed in the recess 110d, so that the counterweight element 130 is supported by the second arc surface (segment S4) of the blocking surface BS and is positioned by the second arc surface (segment S4) of the blocking surface BS. The orthographic projection of the through hole 110c corresponding to the segment S4 on the second surface 110b in a direction parallel to the central axis A at least partially overlaps the orthographic projection of the counterweight element 130 on the second surface 110b in the direction parallel to the central axis A. Next, as shown in FIG. 18C, the adhesive 140, such as a light-curable adhesive, is covered on the counterweight element 130. As shown in FIG. 18D, the adhesive 140 is light-cured by UV light L3 from a UV light source (not numbered) toward the first surface 110a. At the same time, the UV light L3 from another UV light source (not numbered) passes through the through hole 110c corresponding to the segment S4 toward the second surface 110b to light-cure the adhesive 140.

In summary, the embodiments of the present invention have at least one of the following advantages or effects. The main body of the wavelength conversion device is formed with through holes and a recess, and the counterweight element is supported by and is positioned at the stop surface of the recess and overlaps the through holes. Thereby, when the adhesive covering the counterweight element is light-cured, the UV light may not only irradiate the adhesive in the direction of the first surface, but at the same time also irradiate the adhesive in the direction of the second surface through the through holes, so as to improve the efficiency and integrity of light-curing. Thus, the counterweight element may be firmly fixed to the main body of the wavelength conversion device by the adhesive. In addition, when the substrate rotates, the centrifugal force generated by the counterweight element is directed from the central axis to the blocking surface, so that the counterweight element may be blocked by the blocking surface. This prevents the centrifugal force from separating the counterweight element from the substrate. In addition, the airflow generated when the substrate rotates may flow through the through holes that are not covered, thereby improving the heat dissipation efficiency of the substrate.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion device, adapted for rotating with a central axis as a rotation axis, comprising: a main body, at least one counterweight element, and at least one adhesive; wherein the main body has a first surface, a second surface, a plurality of through holes, and a recess, the first surface is opposite to the second surface, the recess is located on the central axis and is recessed into the main body relative to the first surface, the recess has a blocking surface surrounding the central axis, the through holes are disposed in the recess at intervals and penetrate from the first surface to the second surface along a direction parallel to the central axis, the blocking surface is adjacent to the first surface and the through holes, and the blocking surface has a plurality of segments, the segments are, respectively, partial inner walls of the through holes;

the at least one counterweight element is disposed in the recess, wherein the at least one counterweight element is supported by the blocking surface and is positioned by at least one of the segments of the blocking surface, and an orthographic projection of the through hole corresponding to at least one of the segments on the second surface in the direction parallel to the central axis at least partially overlaps an orthographic projection of the at least one counterweight element on the second surface in the direction parallel to the central axis; and the at least one adhesive at least partially covers the at least one counterweight element to adhere the at least one counterweight element to the main body.

2. The wavelength conversion device according to claim 1, wherein the main body comprises a substrate and at least one wavelength conversion layer, the at least one wavelength conversion layer is disposed on the substrate and surrounds the recess, the substrate is adapted for rotating with the central axis as the rotation axis so that the at least one wavelength conversion layer can be rotated around the central axis.

3. The wavelength conversion device according to claim 2, wherein the at least one counterweight element is located between the blocking surface and the central axis in a radial direction of the substrate.

4. The wavelength conversion device according to claim 2, wherein the first surface, the second surface, the through holes, and the recess are formed on the substrate.

5. The wavelength conversion device according to claim 2, wherein the main body further comprises a counterweight plate, the counterweight plate is disposed on the base plate and located on the central axis, the first surface, the second surface, the through holes and the concave portion are formed on the weight plate, the base plate has a plurality of openings, and the through holes correspond to the openings one-to-one, and an orthographic projection of the through holes on the second surface in the direction parallel to the central axis at least partially overlaps an orthographic projection of the openings on the second surface in the direction parallel to the central axis.

6. The wavelength conversion device according to claim 1, wherein the first surface comprises a first step surface and a second step surface, the blocking surface is connected between the first step surface and the second step surface so that the first surface and the blocking surface form a stepped structure, the at least one counterweight element is disposed on the first step surface.

7. The wavelength conversion device according to claim 1, wherein the blocking surface comprises a plurality of first arc surfaces and a plurality of second arc surfaces disposed in a staggered manner, the second arc surfaces are the segments of the blocking surface, the at least one counterweight element is supported by a junction of at least one of the first arc surfaces and an adjacent second arc surface of the second arc surfaces, or is supported by at least one of the second arc surfaces.

8. The wavelength conversion device according to claim 7, wherein a radius of curvature of each of the second arc surfaces is smaller than a radius of curvature of each of the first arc surfaces.

9. The wavelength conversion device according to claim 1, wherein the at least one counterweight element is sheet-shaped, spherical, or conical.

10. The wavelength conversion device according to claim 1, wherein the at least one counterweight element and the at least one adhesive only cover a portion of the through holes, and the at least one adhesive is a light-curable adhesive.

11. A manufacturing method of a wavelength conversion device, comprising:
providing a base material, wherein the base material has a central axis, and a first surface and a second surface opposite to each other;
forming a plurality of through holes and a recess in the base material, wherein the recess is located on the central axis and is recessed into the base material relative to the first surface, the recess has a blocking surface surrounding the central axis, the through holes are disposed in the recess at intervals and penetrate from the first surface to the second surface along a direction parallel to the central axis, the blocking surface is adjacent to the first surface and the through holes, and the blocking surface has a plurality of segments, the segments are, respectively, partial inner walls of the through holes;
disposing at least one counterweight element in the recess, wherein the at least one counterweight element is supported by the blocking surface and is positioned by at least one of the segments of the blocking surface, and an orthographic projection of the through hole corresponding to at least one of the segments on the second surface in the direction parallel to the central axis at least partially overlaps an orthographic projection of the at least one counterweight element on the second surface in the direction parallel to the central axis;
covering at least one adhesive on the at least one counterweight element; and
light-curing the at least one adhesive toward a direction of the first surface, and light-curing the at least one adhesive toward a direction of the second surface through the through hole corresponding to the at least one of the segments.

12. The manufacturing method of the wavelength conversion device according to claim 11, wherein forming the through holes and the recess in the base material comprises:
stamping the base material along a direction from the second surface to the first surface to form a protruding platform structure on the base material;
forming the through holes in the protruding platform structure along the direction parallel to the central axis; and
stamping the protruding platform structure along a direction from the first surface to the second surface, so as to form the recess in the central area of the protruding platform structure and form an annular protruding portion at a periphery of the protruding platform structure, wherein a side surface of the recess forms the blocking surface, a bottom surface of the recess is a first step surface, a top surface of the annular protruding portion is a second step surface, the blocking surface is connected between the first step surface and the second step surface, the through holes are located at a junction of the first step surface and the blocking surface.

13. The manufacturing method of the wavelength conversion device according to claim 11, wherein the base material forms a substrate of the wavelength conversion device, the manufacturing method comprises:
disposing at least one wavelength conversion layer on the substrate, wherein the at least one wavelength conversion layer surrounds the recess.

14. The manufacturing method of the wavelength conversion device according to claim 11, wherein the base material forms a counterweight plate of the wavelength conversion device, the manufacturing method comprises:
providing a substrate;
disposing at least one wavelength conversion layer on the substrate, wherein the at least one wavelength conversion layer surrounds the recess; and
disposing the counterweight plate on the substrate, wherein the counterweight plate is located on the central axis.

15. The manufacturing method of the wavelength conversion device according to claim 14, comprising:
forming a plurality of openings on the substrate, so that the through holes correspond to the openings one-to-one, wherein an orthographic projection of the through holes on the second surface in the direction parallel to the central axis at least partially overlaps an orthographic projection of the openings on the second surface in the direction parallel to the central axis.

16. The manufacturing method of the wavelength conversion device according to claim 11, comprising:
forming a stepped structure with the first surface and the blocking surface.

17. The manufacturing method of the wavelength conversion device according to claim 11, comprising:
forming the blocking surface to comprise a plurality of first arc surfaces and a plurality of second arc surfaces in a staggered manner, wherein the second arc surfaces are the segments of the blocking surface; and
supporting by a junction of at least one of the first arc surfaces and an adjacent second arc surface of the second arc surfaces with the at least one counterweight element, or supporting by at least one of the second arc surfaces with the at least one counterweight element.

18. The manufacturing method of the wavelength conversion device according to claim 17, comprising:
forming a radius of curvature of each of the second arc surfaces to be smaller than a radius of curvature of each of the first arc surfaces.

19. The manufacturing method of the wavelength conversion device according to claim 11, comprising:

only covering a portion of the through holes with the at least one counterweight element and the at least one adhesive, wherein the at least one adhesive is a light-curing adhesive.

20. The manufacturing method of the wavelength conversion device according to claim 11, wherein the blocking surface and the first surface are perpendicular to each other, or the blocking surface is relatively inclined to the first surface.

* * * * *